P. McCOLLUM.
Hand Corn-Planter.
No. 197,045. Patented Nov. 13, 1877.
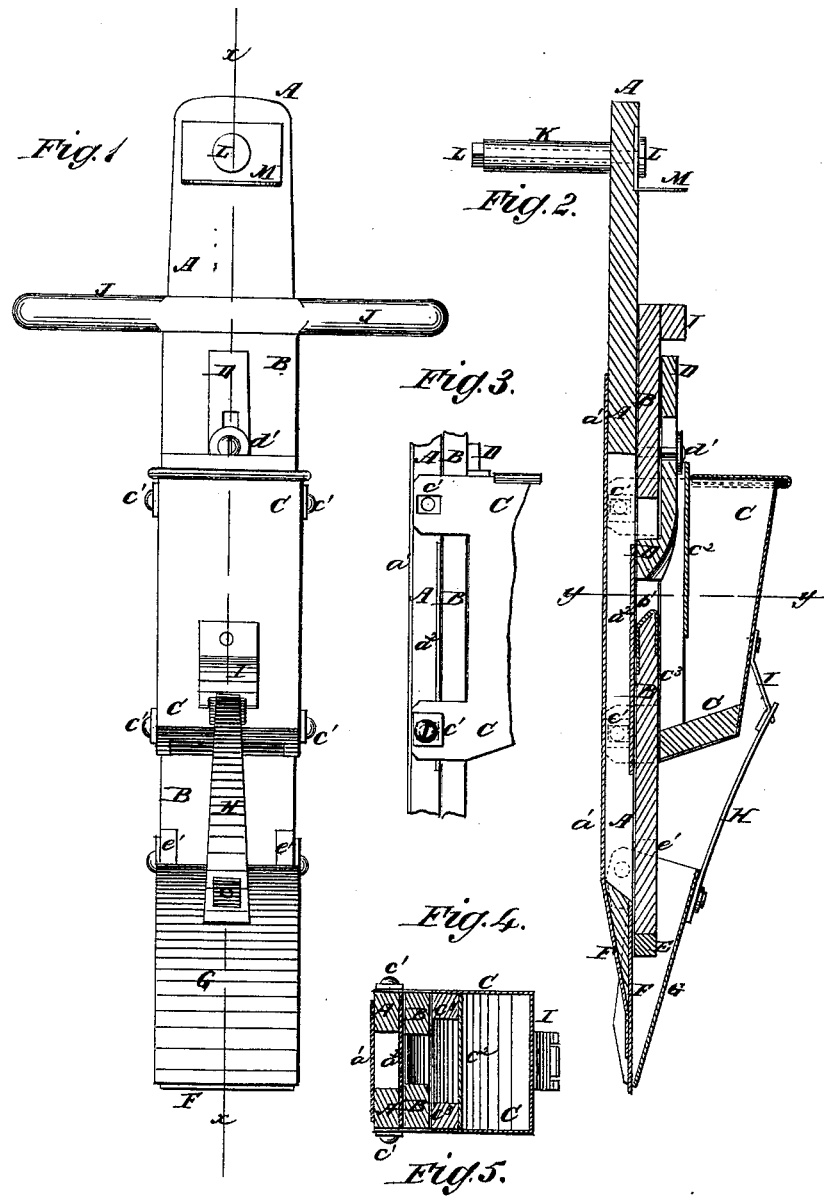
WITNESSES:
INVENTOR:
P. McCollum
BY 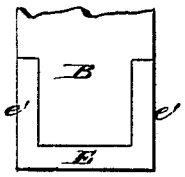
ATTORNEYS.

UNITED STATES PATENT OFFICE.

PETER McCOLLUM, OF FAYETTE, MISSOURI.

IMPROVEMENT IN HAND CORN-PLANTERS.

Specification forming part of Letters Patent No. 197,045, dated November 13, 1877; application filed August 24, 1877.

*To all whom it may concern:*

Be it known that I, PETER McCOLLUM, of Fayette, in the county of Howard and State of Missouri, have invented a new and useful Improvement in Hand Corn-Planter, of which the following is a specification:

Figure 1 is a front view of my improved corn-planter. Fig. 2 is a longitudinal section of the same, taken through the line $x\ x$, Fig. 1. Fig. 3 is a detail side view of a part of the same. Fig. 4 is a detail cross-section of the same, taken through the line $y\ y$, Fig. 1. Fig. 5 is a detail view of the lower part of the plunger.

Similar letters of reference indicate corresponding parts.

The object of this invention is to furnish an improved hand corn-planter which shall be simple in construction, effective in operation, not liable to clog in wet ground, and which will scatter the seed as it plants it.

The invention consists in the construction and arrangement of parts, which will be hereinafter fully explained, and then pointed out in the claims.

A is the main board of the planter, along the forward side of which moves the plunger B. C is the seed-box or hopper, the sides of which, or lugs formed upon said sides, project across and are secured to the side edges of the middle part of the main board A by screws $c^1$, which pass through short slots in said sides or lugs, and screw into the said side edges, to enable the seed-box to be adjusted should the plunger B work too tight or too loose. The plunger B passes down through a hole in the bottom of the seed-box C.

In the interior of the seed-box C is a cross-partition, $c^2$, extending nearly to the bottom of said seed-box, so that the corn may pass beneath its lower edge to the plunger B. The partition $c^2$ is designed to prevent the corn in the seed-box C from pressing against the corn in the discharge-opening of the plunger B. The discharge-opening in the plunger B is made in the form of a slot, and its size is regulated to cause it to discharge only the desired amount of seed by adjusting the regulator D, the shank of which extends up along the forward side of the plunger B, and is slotted longitudinally to receive the screw $d'$, by which it is secured to the said plunger.

The forward side of the lower end of the regulator D is concaved or grooved, as shown in Fig. 2, so that the corn may pass into the discharge-opening more readily. The bottom of the discharge-opening inclines to the rearward, so that the corn may pass out more readily, and is covered with a metal facing, $b'$, to prevent wear.

The middle part of the main board A is slotted longitudinally from its lower end, to form a passage for the corn from the discharge-opening of the plunger to the lower end of the planter. The passage thus formed is covered upon the rear side by a plate, $a^1$, attached to to the board A, and upon the forward side by the plunger B.

To the forward side of the board A, opposite the lower part of the seed-box C, is attached a plate, $a^2$, so that the corn in the dropping-hole of the plunger B must be carried up above the corn in the seed-box C before it can pass into the passage in the board A.

The ends of the partition $c^2$ are attached to the wooden bars $c^3$, which are attached to the sides of the seed-box C and rest against the forward side of the plunger B, to keep said plunger in place while moving up and down. To the lower end of the plunger B is attached a solid iron tip, E, which is made with upwardly-projecting arms $e'$ upon its ends, which arms are let into and secured to the side edges of the said lower end of the plunger. The lower end of the main board A is beveled or tapered upon its rear side, to enable it to enter the soil readily, and to the front and rear sides of said end are attached metal plates F, to prevent wear.

G is a metal plate, the side parts of which are bent inward at right angles, overlap the side edges of the lower end of the board A, and are pivoted to said side edges by screws. The lower edges of the foot-plate G rest against the forward side of the lower part of the forward plate F at an acute angle, so that the instrument may be easily pressed into the ground.

To the upper middle part of the plate G is pivoted the lower end of a spring, H, the upper end of which rests upon the forward part of the lower end of the seed-box C, or upon the end of a small outwardly-projecting plate, I, attached to the lower part of the said seed-box C, according as a weak or a strong spring is required.

The spring H may be turned to one side to enable the lower end of the plate G to be turned up for removing any soil that may collect beneath it. The plunger B is raised and lowered by the handle J, attached to its upper end.

The planter is carried by a handle, K, secured to the rear side of the upper end of the main board A by a bolt, L, that passes longitudinally through the said handle K, through the upper end of the said board A, and is secured in place by a nut.

M is a right-angled plate, which is secured to the forward side of the upper end of the board A by the bolt L, the outwardly-projecting part of which serves as a stop for the upper end of the plunger B to strike against to prevent the said plunger from being drawn too far out.

With this construction the plunger B may be withdrawn by removing a single bolt, L. If desired, a hole may be formed in the plate M, to receive a guide-rod attached to the handle J, to keep the plunger in line as it moves up and down.

Having thus described my invention, I claim as new and desire to secure by Letters Patent—

1. In a hand corn-planter, the combination, with the main board A and seed-box C, of the pivoted foot-piece G, and the spring H, pivoted to said foot-piece, so as to be turned aside, and having its free end resting on the seed-box, so as to slide thereon, as and for the object stated.

2. The combination of the outwardly-projecting plate I, having stop-lugs, and the pivoted and sliding spring H with the pivoted foot-piece G, main board A, and seed-box C, as and for the purpose set forth.

3. The seed-box C, having slotted side lugs, and the bolts $c^1$, in combination with the main board A and plunger B, for adjusting the seed-box to regulate the friction of the plunger, as herein set forth.

PETER McCOLLUM.

Witnesses:
H. B. WATTS,
C. E. BETTS.